(12) United States Patent
Ziolkowski et al.

(10) Patent No.: US 11,522,823 B2
(45) Date of Patent: Dec. 6, 2022

(54) METHOD AND APPARATUS FOR STORING EMAIL MESSAGES

(71) Applicant: TJ²Z Patent Licensing and Tech Transfer, LLC, Port Washington, WI (US)

(72) Inventors: Timothy J. Ziolkowski, Grafton, WI (US); Kent L. Baker, Menomonee Falls, WI (US)

(73) Assignee: TJ²Z Patent Licensing and Tech Transfer, LLC, Port Washington, WI (US)

( * ) Notice: Subject to any disclaimer, the term of this patent is extended or adjusted under 35 U.S.C. 154(b) by 356 days.

(21) Appl. No.: 16/180,573

(22) Filed: Nov. 5, 2018

(65) Prior Publication Data

US 2019/0140998 A1 May 9, 2019

Related U.S. Application Data

(63) Continuation of application No. 15/700,356, filed on Sep. 11, 2017, now Pat. No. 10,122,667, which is a continuation of application No. 15/206,540, filed on Jul. 11, 2016, now Pat. No. 9,762,522, which is a continuation of application No. 14/220,183, filed on Mar. 20, 2014, now Pat. No. 9,391,939, which is a continuation of application No. 10/907,774, filed on Apr. 14, 2005, now Pat. No. 8,713,109.

(51) Int. Cl.
| | | |
|---|---|---|
| *G06F 16/13* | (2019.01) | |
| *H04L 51/42* | (2022.01) | |
| *G06F 16/22* | (2019.01) | |
| *G06F 16/11* | (2019.01) | |
| *G06F 16/14* | (2019.01) | |
| *G06F 16/16* | (2019.01) | |
| *G06Q 10/10* | (2012.01) | |

(52) U.S. Cl.
CPC ............ *H04L 51/42* (2022.05); *G06F 16/116* (2019.01); *G06F 16/13* (2019.01); *G06F 16/148* (2019.01); *G06F 16/164* (2019.01); *G06F 16/22* (2019.01); *G06Q 10/107* (2013.01)

(58) Field of Classification Search
None
See application file for complete search history.

(56) References Cited

U.S. PATENT DOCUMENTS

| | | |
|---|---|---|
| 6,020,890 A | 2/2000 | Kohda |
| 6,020,980 A | 2/2000 | Freeman |
| 6,029,164 A | 2/2000 | Birrell et al. |
| 6,725,228 B1 | 4/2004 | Clark et al. |

(Continued)

OTHER PUBLICATIONS

"ExLife—inbox, outbox, folder assistant [ORNIC USA, LLC]", pp. 1-4, http://www.omicusa.com/old/add-ins/exlife.shtml.

(Continued)

*Primary Examiner* — Shripal K Khajuria
(74) *Attorney, Agent, or Firm* — Ziolkowski Patent Solutions Group, SC

(57) ABSTRACT

A method for saving an email to an electronic storage location is disclosed. A topic identifier located in the email is used to locate a storage location on the electronic storage device for saving the email message. Emails relating to the same topics of interest may be stored in the same storage location.

28 Claims, 4 Drawing Sheets

(56) References Cited

U.S. PATENT DOCUMENTS

| | | |
|---|---|---|
| 6,941,304 B2 | 9/2005 | Gainey et al. |
| 7,328,244 B1* | 2/2008 | Kelley .................. G06F 16/353 |
| | | 709/201 |
| 2002/0099681 A1* | 7/2002 | Gainey ................ G06Q 10/107 |
| 2003/0233411 A1* | 12/2003 | Parry ................... G06Q 10/107 |
| | | 710/33 |
| 2003/0236836 A1 | 12/2003 | Borthwick |
| 2005/0027839 A1 | 2/2005 | Day et al. |
| 2005/0065906 A1* | 3/2005 | Romero ................ H04L 51/214 |
| 2005/0144189 A1 | 6/2005 | Edwards et al. |
| 2006/0069690 A1 | 3/2006 | Patel et al. |
| 2007/0029915 A1 | 2/2007 | Kim et al. |
| 2007/0192422 A1 | 8/2007 | Stark et al. |
| 2007/0294352 A1 | 12/2007 | Shraim et al. |

OTHER PUBLICATIONS

"Control and organize emails with InboxRULES [ORNIC USA]", pp. 1-2, http://www.ornicusa.com/products/.

\* cited by examiner

METHOD AND APPARATUS FOR STORING EMAIL MESSAGES

CROSS-REFERENCE TO RELATED APPLICATIONS

The present application is a continuation of, and claims priority to, U.S. patent application Ser. No. 15/700,356, filed Sep. 11, 2017, which is a continuation of, and claims priority to, U.S. patent application Ser. No. 15/206,540, filed Jul. 11, 2016, now Issued U.S. Pat. No. 9,762,522, which is a continuation of, and claims priority to, U.S. patent application Ser. No. 14/220,183, filed Mar. 20, 2014, now Issued U.S. Pat. No. 9,391,939, which is a continuation of, and claims priority to, U.S. patent application Ser. No. 10/907,774, filed Apr. 14, 2005, now Issued U.S. Pat. No. 8,713,109, the disclosures of which are incorporated herein by reference in their entireties.

BACKGROUND OF THE INVENTION

The present invention relates generally to electronic messaging and more particularly to a method of saving an electronic mail message to a storage location on a computer storage device.

Emails have become an important part of communications for business and personal use. Emails offer a quick and effective means of communicating between remote senders and receivers. Corporate and non-corporate individuals use emails to transmit information to family members, clients, business associates, and the like. Not only do emails expedite communication, but emails also provide a "written" record of what was communicated from a sender to a receiver. This is especially important in corporate or business settings where it is often desirous to keep a record of communications sent from or received by one member or all members in the organization.

An email message folder, such as a "sent" folder, may be configured for storing copies of emails sent by a user. The sent folder may contain copies of the emails sent from the user to other recipients; however, emails received by the user are not typically stored in the sent folder. Furthermore, many companies require that emails stored within the email program structure, which includes the sent folder, must be purged or deleted after a period of time has elapsed, such as 60 or 90 days. In fact, many companies perform this email cleanup automatically and without the knowledge of its users. In this case, the sent folder cannot be reliably used to retain copies of emails communicated to another party past the period of time for deleting emails.

Some methods of storing emails require a user to identify a root or target directory of an electronic storage medium such as a hard drive of a file server, where it is desired to save the email message. Other methods, however, do not prompt a user for a desired save location and save all emails to a single target directory. In this manner, emails having independent subject matter, sender, receiver, and the like, are stored together in the same location on the file server.

Other methods of storing an email message on an electronic storage device use user-selected options to create subfolders in a target directory. For example, subfolders may be created for the email sender, the date the email was sent, the recipients of the email, or the domain of the sender. When creating subfolders for senders, emails from one sender may be stored in a subfolder assigned to the one sender, and emails from another sender may be stored in a separate subfolder assigned to the other sender. However, one sender may send several emails, each relating to a separate topic of interest. Accordingly, the subfolder may contain emails from a particular sender that relate to multiple topics of interest. Such a convoluted system is particularly burdensome when locating and retrieving a stored email. Additionally, if stored in subfolders of the email program, they are generally not exempt from corporate purge policies.

It is often desirable, however, to store emails together in file locations according to topics of interest regardless of the sender. That is, it would be desirable to be capable of storing emails related to one topic of interest for several senders in one location and storing emails related to another topic of interest from the same or other senders in another location, and so on. Thus, it is desirable to segment and separately store emails based on subject matter. In this manner, for example, and in the context of a law firm, emails pertaining to a particular client matter may be stored in locations associated with the client files, and in particular, specially designated attorney-client correspondence files.

Accordingly, there is a need for a method and system of automatically storing emails relating to similar topics of interest on a computer storage medium in a storage location dedicated to or otherwise associated with the topic of interest.

BRIEF DESCRIPTION OF THE INVENTION

The present invention provides a method and system for saving information contained in an email that overcomes the aforementioned drawbacks. The present invention includes a method of acquiring an identifier that indicates a matter or discussion topic to which the email pertains. The identifier is used to identify a storage location on a computer storage device, and the email is automatically saved thereto.

In accordance with one aspect of the present invention, a method of saving an email includes the step of acquiring a project file identifier associated with an email. The method also includes the steps of querying an electronic storage device to locate a storage location on the electronic storage device corresponding to the project file identifier and automatically storing information contained in the email to the storage location.

In accordance with another aspect of the present invention, a computer readable storage medium has stored thereon a computer program comprising instructions which, when executed by at least one processor, cause the at least one processor to determine if a storage location identifier exists in at least one of a subject line and a body of an email. If the storage location identifier exists, the at least one processor automatically queries an electronic storage medium to locate a physical storage location on the electronic storage medium based on the storage location identifier and automatically stores information contained in the email to the physical storage location.

In accordance with yet another aspect of the present invention, a system for distributed file access includes a remote server having a database for storing emails. The system also includes a computer workstation capable of communication with the remote server, the computer workstation having thereon a computer readable storage medium having stored thereon a computer program comprising instructions which when executed by a computer cause the computer to determine a storage location identifier of an email, the storage location identifier comprising a client/customer number and a matter number. The computer program further causes the computer to determine an email storage location on an electronic storage device from the storage location identifier and automatically store the email to the email storage location on the electronic storage device.

Various other features and advantages of the present invention will be made apparent from the following detailed description and the drawings.

BRIEF DESCRIPTION OF THE DRAWINGS

The drawings illustrate one preferred embodiment presently contemplated for carrying out the invention.

In the drawings.

DETAILED DESCRIPTION OF THE PREFERRED EMBODIMENT

Figure 1:
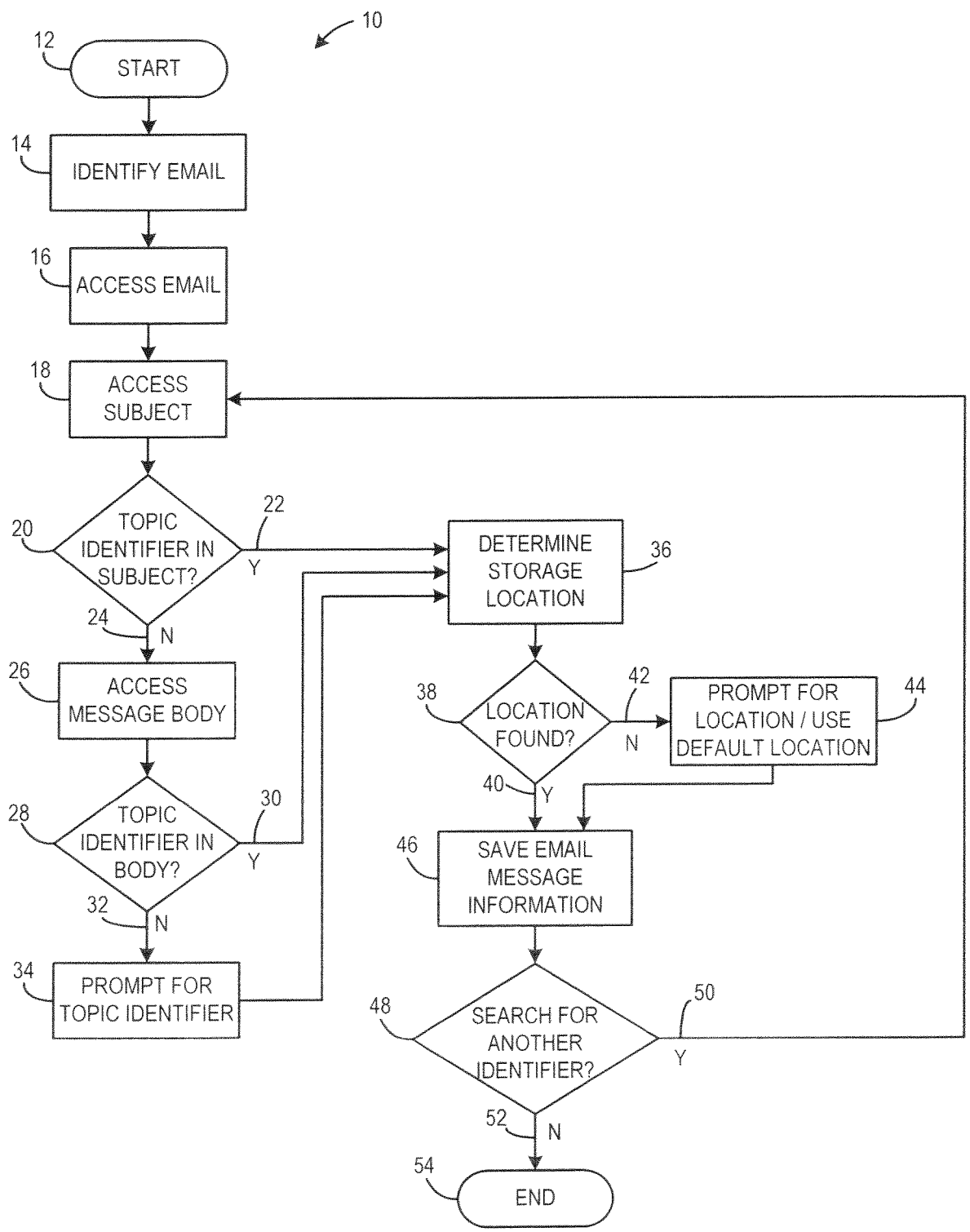
FIG. 1 is a flow chart showing the steps of a technique in accordance with the present invention.

Referring to FIG. 1, a save email technique 10 in accordance with one embodiment of the present invention is shown. The technique 10 begins 12 with identification of an email at 14 to process. It is contemplated that a number of parameters may be used to determine which email to access. For example, the most recently opened or sent email message, a user-selected email in an email folder list, and receiving at least one email identifier uniquely identifying a particular email, such as an item list number, may each be parameters to earmark an email. Once a given email has been identified, the email is accessed 16 such that information contained therein is available to properly store the email on a file server.

After the email is accessed 16, the information contained in the subject, or "re", line and the message body is available for inspection. The order in which the subject line and the message body are accessed may vary from application to application and is interchangeable. In this manner, accessing the subject line before the message body may be preferred when the topic identifier is customarily placed in the subject line. Alternatively, accessing the message body before the subject line may be preferred when the topic identifier is customarily placed in the message body.

Still referring to FIG. 1, the subject line of the email is accessed in step 18, and the save email technique 10 determines whether a topic identifier is found in the subject, or "re", line at step 20. If a topic identifier is found in the subject line 22, then the save email technique 10 proceeds to step 36 as described below. If a topic identifier is not found in the subject line 24, then the message body of the email is analyzed 26. Technique 10 then determines whether a topic identifier is found in the message body at step 28. If a topic identifier is found in the message body 30, then the save email technique 10 proceeds to step 36 described below. If a topic identifier is not found in the message body 32, then the save email technique 10 prompts a user to input a topic identifier 34 and proceeds to step 36 described below.

A topic identifier may indicate, for example, a client or customer and a matter number for that client/customer. The topic identifier may also indicate a project file identifier for a client/customer. A project file separates work associated with the project file from work associated with a different project file for a client/customer. The project file identifier identifies the client/customer project file and includes not only the client/customer, but it also includes the project file. The topic identifier may include a series of alpha-numeric and/or other characters that uniquely identify a topic of the email. The topic identifier may contain a set pattern or arrangement whereby all topic identifiers contain the same type of characters in the same character positions. That is, all topic identifiers may be designed to contain a set number of alphabetic characters followed by a set number of numeric characters. In this manner, portions of the subject line and message body may be searched for a character pattern that matches the character pattern of the topic identifiers. For example, if all topic identifiers contain four alphabetic characters followed by four integers, such as ABCD0001, ABCD0002, etc., the subject line and/or message body can be searched for an eight-character word pattern matching the pattern "@@@@####", where "@" represents an alphabetic character and "#" represents an integer. The topic identifier may also include a period or a dash separating a customer identifier from a matter identifier, such as ABCD.001 or ABCD-0001. Alternatively, the topic identifiers may contain characters that uniquely identify the topic but do not contain the same type of characters in the same character positions. The technique of the present invention may be easily modified to work with any firm's or company's existing client/customer identifiers so as to not require any modification of its on-going use of its particular identifying system.

A database may also be created and maintained for matching topic identifiers whether or not the same character pattern is used for all topic identifiers. The database may contain records of topic identifiers for determining whether the subject line and/or message body contain a topic identifier. In this manner, each topic identifier in the database is accessed and compared with portions of the subject line and/or message body until a match is found or until the all records in the database have been accessed and no match is found.

Still referring to FIG. 1, a storage location on an electronic storage medium is determined at step 36. When a database is used, each database record may contain a unique topic identifier and a storage location on the electronic storage medium for the unique topic identifier. The storage location, in this manner, is determined from the database record once the database record matching the topic identifier is located.

Alternatively, the storage location can be determined dynamically, or on-the-fly, on an electronic storage device set up to contain at least portions of the topic identifier in the names of the folders and sub-folders. Using ABCD.0001 and ABCD.0002 as examples, a client folder on the electronic storage device containing at least the unique characters "ABCD" may be created having sub-folders created therein—one sub-folder for matter number "0001" and another sub-folder for matter number "0002". The storage location for an email containing the topic identifier "ABCD.0002" may be located by comparing all client folders to see if "ABCD" is found therein and comparing all sub-folders of client folder "ABCD" to see if "0002" is found therein.

At step 38, save email technique 10 determines whether a storage location was found in the preceding step. If a storage location has been determined, technique 10 proceeds to step 46. If a storage location has not been found, the user is prompted to input a storage location 44, and save email technique 10 proceeds to step 46.

At step 46, information contained in the email is saved to an email file at the determined storage location. Information such as the sender, the receiver, the send or receive date, the subject line, and the message body can be saved to the email file. The file may be saved in one of a variety of electronic file formats including a plain text formatted file, a Hypertext Markup Language (HTML) formatted file, and an email formatted file. The file formats may be determined from the type, or format, of the email. The file format in which to save the email may be determined by default or from a user input.

The title of the email file may contain information from the email so that the email file can be distinguished from other email files saved in the same storage location. The title may contain the sender, the receiver, the send or receive date, the subject line, and any other distinguishing identification. In the preferred embodiment, the title includes the date the email was sent or received, the client/customer sender or recipient of the email, and the subject line of the email message. For example, a title including the following format has been found to be most desirable for quickly determining the "when", "who", and "what" of the saved emails: "YYYY.MM.DD Sender Subject line", where YYYY.MM.DD represents the 4-digit year, 2-digit month, and 2-digit day, respectively. The title may be determined automatically or received as input from the user. For example, the user may choose to use an abbreviated form of the recipient's name or an abbreviated subject line. In case an email file already exists with the same name as the current email file to be saved, the user may be prompted to enter a unique name or a unique identifier may be added to the title to distinguish the current email file title from the existing file title. An integer may also be added in parentheses to distinguish commonly-named saved files. For example, "email title" and "email title (1)".

The present invention also contemplates that the title of the email file may be modified or truncated where a backup system controlling the backup of at least a portion of the electronic storage device requires that no more than a maximum number of characters exist in the complete path of a file name in order to back up the file. Once a storage location and a title are determined, the number of characters therein may be compared with a maximum number of characters allowed for backup. If the number of characters in the title exceeds the maximum number of characters allowed for backup, the title may be automatically modified to contain no more than the maximum number of characters. Alternatively, the title may be displayed to the user for modifying the number of characters therein.

Still referring to FIG. 1, save email technique 10 determines whether to search for topic identifiers 48 not previously found in the email. This allows for an email that relates to multiple topics to be saved in multiple locations automatically. This allows an email pertaining to multiple matters to be saved in each file that it pertains to. If other topic identifiers are to be determined 50, technique 10 returns to step 18 and proceeds as described above; otherwise, other topic identifiers are not to be determined 52, and save email technique 10 terminates 54.

Figure 2:
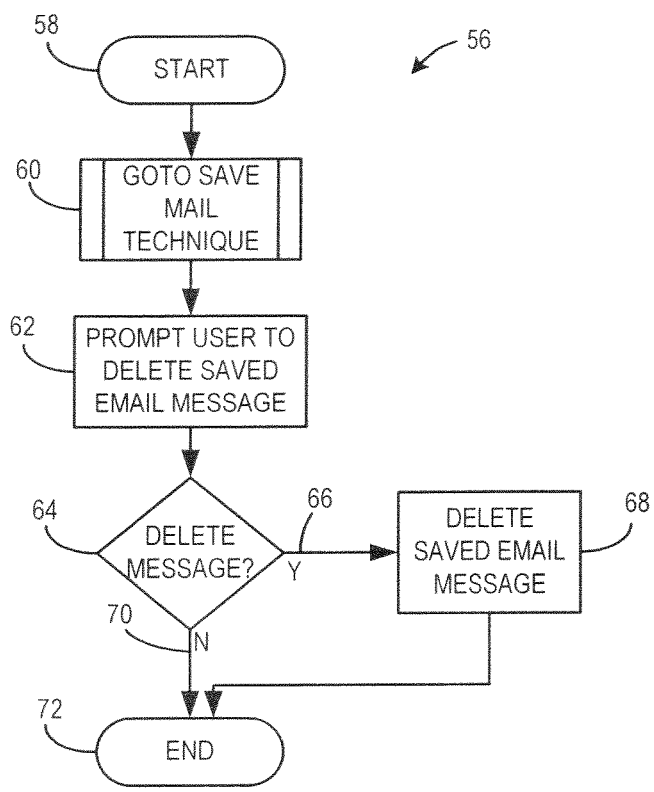
FIG. 2 is a flow chart showing the steps of an optional technique incorporating the steps of FIG. 1 in accordance with the present invention.

Referring now to FIG. 2, an optional technique 56 is shown incorporating the steps of save email technique 10 as described above that saves all emails to a topic storage location. An email is first saved to the topic storage location. Then, a determination is made whether the email should be deleted. In this manner, the all emails are saved to the topic storage location before being deleted. After initialization 58, technique 56 calls save email technique 10 at step 60 and performs the steps of save email technique 10 as described above. After termination of the steps of save email technique 10, the user is prompted to delete the saved email 62 previously saved using save email technique 10. Technique 56 receives user input and determines whether to keep or delete the saved email at 64. If the user input indicates that the saved email should be deleted 66, then technique 56 deletes the saved email 68 and terminates 72. If the user input indicates that the saved email should not be deleted 70, then technique 56 terminates 72.

Figure 3:
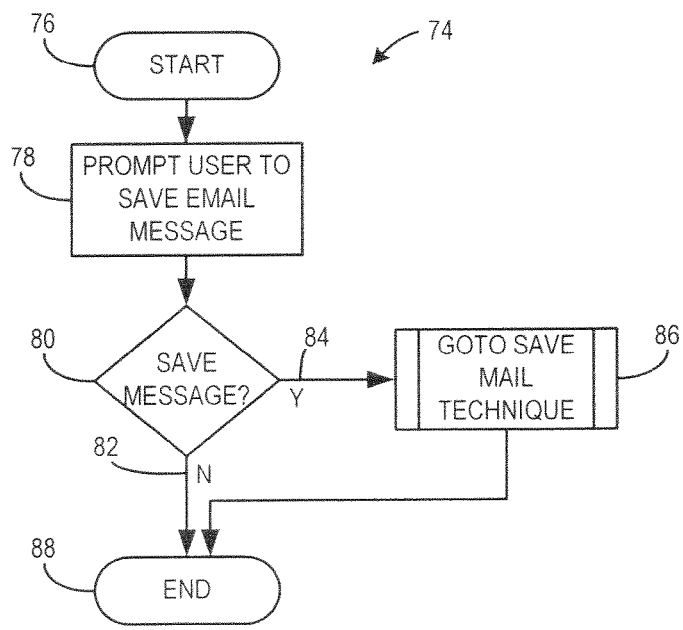
FIG. 3 is a flow chart showing the steps of another optional technique incorporating the steps of FIG. 1 in accordance with the present invention.

Converse to technique 56, FIG. 3 shows another optional technique 74 incorporating the steps of save email technique 10 as described above that saves emails to a topic storage location only after it has been determined that it should be saved. In this manner, only those emails determined to be saved in the topic storage location are saved in the topic storage location. After initialization 76, the user is prompted to save an email using save email technique 10. Technique 74 receives user input and determines at step 80 whether to save the email or to terminate. If the user input indicates that the email should not be saved 82, then technique 74 terminates 88. If the user input indicates that the email should be saved 84, technique 74 performs the steps of save email technique 10 at 86 as described above. After termination of save email technique 10, technique 74 terminates 88.

Figure 4:
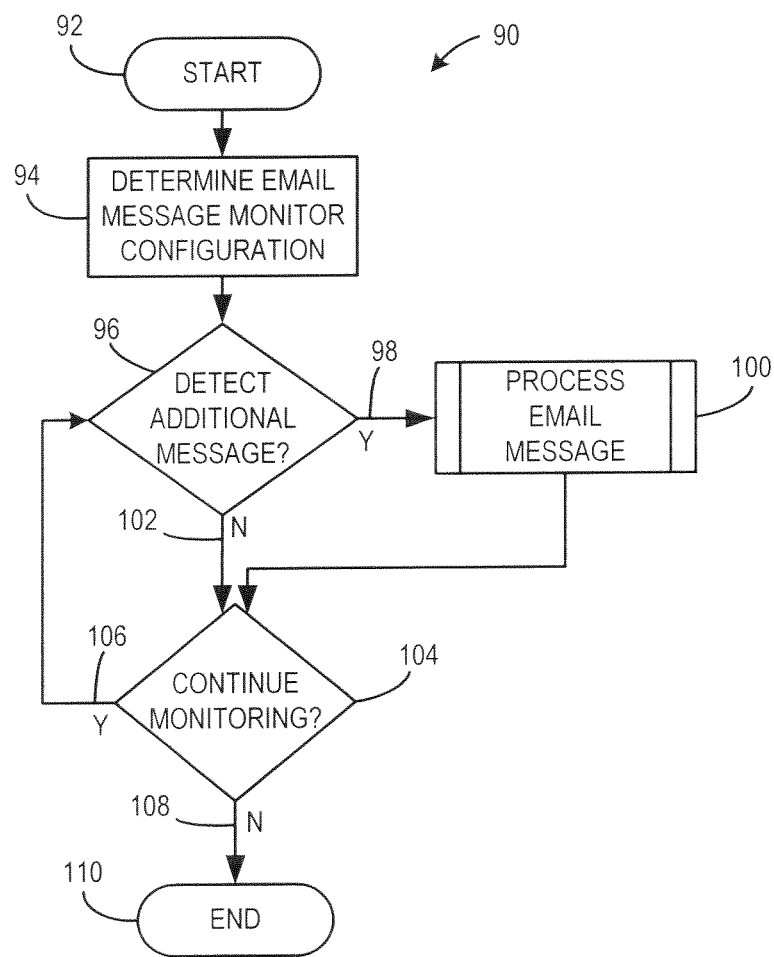
FIG. 4 is a flow chart showing the steps of an optional technique incorporating the steps of the techniques shown in FIGS. 1, 2, and/or 3 in accordance with the present invention.

FIG. 4 illustrates an optional technique 90 for automatically detecting an email having information to be saved. Technique 90 begins at step 92 and an email monitor configuration is determined at step 94. The email monitor configuration may include automatically monitoring a mailbox and/or message folder of an email server for the addition of an email thereto. For example, the email monitor configuration may automatically monitor a folder configured to receive copies of sent messages or a folder configured to receive incoming emails. The email monitor configuration may also include automatically monitoring outgoing emails as they are sent or are in the process of being sent.

After the email monitor configuration is determined, technique 90 determines whether an additional email has been detected. If an additional email has been detected 98, then the additional email may be processed 100 according to the steps of any of techniques 10, 56, and 74 as described above. After processing the additional email, technique 90 proceeds to step 104 as described below. If an additional message has not been detected 102, then technique 90 determines whether monitoring should continue 104. If monitoring should continue 106, then technique 90 returns to step 96 and proceeds as described above. If monitoring should not continue 108, then technique 90 terminates 110.

Figure 5:
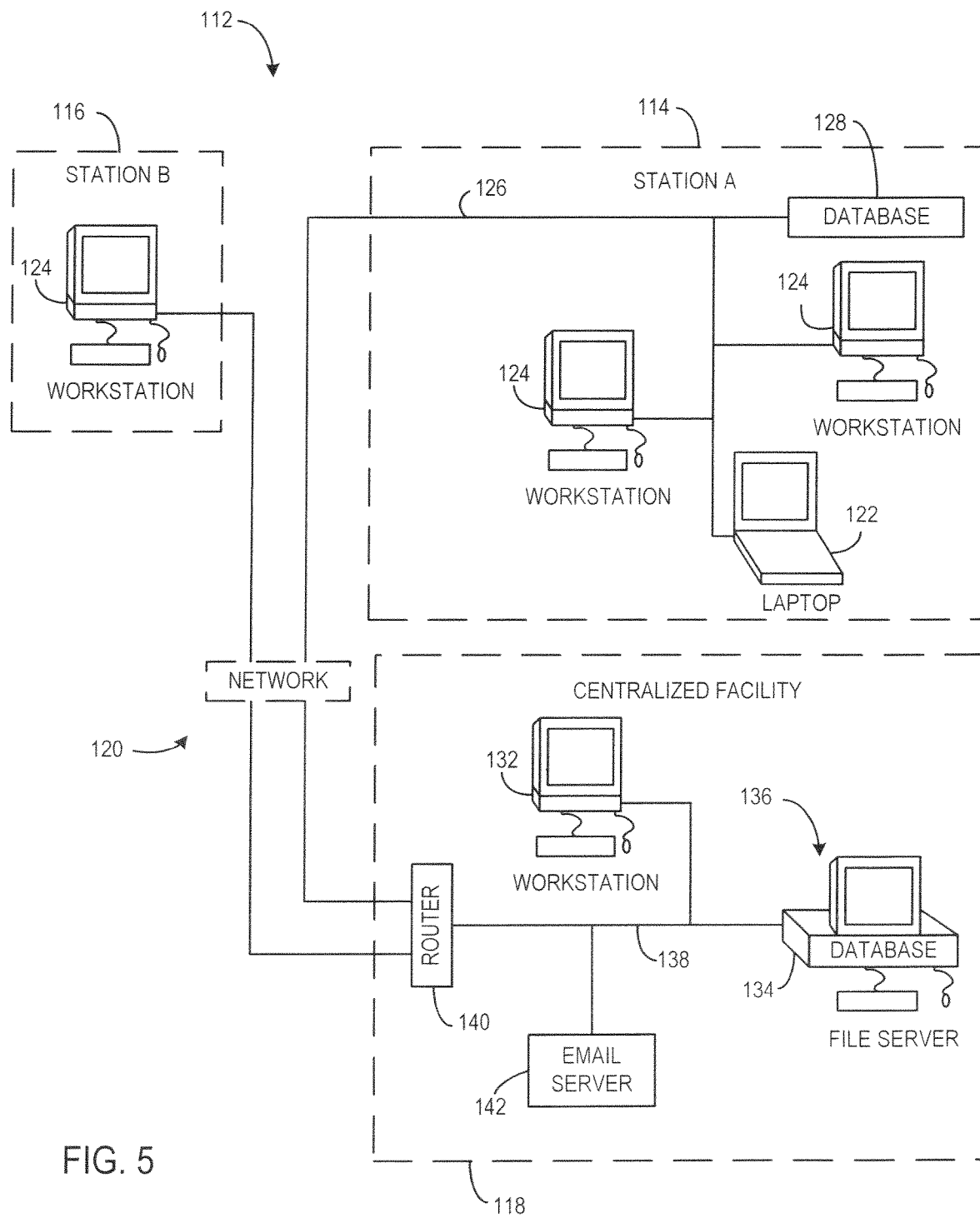
FIG. 5 is a schematic representation of a multi-node network of an email system incorporating the present invention.

Referring now to FIG. 5, an overview block diagram of a computer network system 112 is shown which includes a plurality of stations, such as Station A referenced with numeral 114, and Station B referenced with numeral 116, which may include business, office, home, or library facilities. It is understood that the number of stations can be limitless, but two specific embodiments are shown with Station A and Station B, which will be further explained hereinafter. The stations 114, 116 are connected to a centralized facility 118 through a communications link 120, such as a network of interconnected server nodes. This network of interconnected nodes may be a secure, internal, intranet or a public communications network, such as the internet. Furthermore, the nodes may be interconnected through wired or wireless protocols. Although a single centralized facility is shown and described, it is understood that the present invention contemplates the use of multiple centralized facilities, each capable of communication with each station. Each station has operational software associated therewith which can be serviced by the centralized facility 118.

The various systems disclosed are configured to be selectively linked to the centralized facility 118 by a workstation, which in the example of station 114, includes a laptop computer 122 or permanent workstation 124 connected to an internal network 126. Such selective linking is desirable for accessing data from the systems and transmitting data to the systems.

It is understood that workstations 122, 124 are linked together by the internal network 126. Additionally, each workstation 122, 124 may be linked to a local database 128 configured to store emails, as will be discussed shortly. Further, such a system is provided with communications components allowing it to send and receive data over a communications link 120. Similarly, a non-networked workstation 124 at remote station 116 is connected to communications link 120 through which it can communicate with the centralized facility 118. A workstation 132, located at the centralized facility 118, connects to a centralized database 134 included in a file server 136 located on intranet 138. Workstations 122, 124 external to the local intranet 138 containing the centralized database 134 can access the database as though located locally on the intranet 138 through communications link 120 and router 140. More specifically, as will be described, workstations 122, 124, and 132 can access the data stored in the centralized database 134, or other remote database, such as database 128, as though the data were stored in a database within the specific workstation requesting the data.

As previously discussed, each of the systems and substations described herein and referenced in FIG. 2 may be linked selectively to the centralized facility 118 via a network 120. According to the present invention, any acceptable network may be employed whether public, open, dedicated, private, or so forth. The communications links to the network may be of any acceptable type, including conventional telephone lines, fiber optics, cable modem links, digital subscriber lines, wireless data transfer systems, or the like. Each of the systems is provided with communications interface hardware and software of generally known design, permitting them to establish network links and exchange data with the centralized facility 118. However, the systems or particularly, workstations 122, 124 are provided with specialized software so as to communicate with the centralized facility 118 and particularly with the remote database 134 as though the data stored in the remote database is located locally on workstation 122, 124. In some cases, during periods when no data is exchanged between the stations and the centralized facility, the network connection can be terminated. In other cases, the network connection is maintained continuously.

In one embodiment, a user logged into a workstation computer 122, 124, and 132 connected, either remotely or directly, to intranet 138 receives emails from an email server 142 connected to intranet 138. Once the emails are received, any of the techniques 112, 56, and 74 described above, may be initiated to process any of the emails that need to be stored. Workstations 122, 124 at Station A may store emails on database 128 or database 134 when connected to intranet 138. Workstation 124 at Station B and workstation 132 may store emails on database 134 when connected to intranet 138. Additionally, all workstations may store emails locally on electronic storage devices inside each workstation for later transfer to database 128 or database 134. Database 134 need not be located in a separate centralized facility 118. That is, database 134 may be located in either one of stations 114, 116 as well as be remotely located within that station and the workstation 122, 124 requiring access to the scanning data.

The stored emails are preferably stored in locations designated for service provider/client correspondence. For example, an accounting or law firm may store all client correspondence emails in correspondence folders located within each client folder. In this manner, all email correspondence with a particular client may be more easily located or retrieved when necessary. When logged into a workstation connected to database 128 or database 136, a user may save emails thereto or retrieve saved emails therefrom.

Therefore, in accordance with one embodiment of the present invention, a method of saving an email includes the step of acquiring a project file identifier associated with an email. The method also includes the steps of querying an electronic storage device to locate a storage location on the electronic storage device corresponding to the project file identifier and automatically storing information contained in the email to the storage location.

In accordance with another embodiment of the present invention, a computer readable storage medium has stored thereon a computer program comprising instructions which, when executed by at least one processor, cause the at least one processor to determine if a storage location identifier exists in at least one of a subject line and a body of an email. If the storage location identifier exists, the at least one processor automatically queries an electronic storage medium to locate a physical storage location on the electronic storage medium based on the storage location identifier and automatically stores information contained in the email to the physical storage location.

In accordance with yet another embodiment of the present invention, a system for distributed file access includes a remote server having a database for storing emails. The system also includes a computer workstation capable of communication with the remote server, the computer workstation having thereon a computer readable storage medium having stored thereon a computer program comprising instructions which when executed by a computer cause the computer to determine a storage location identifier of an email, the storage location identifier comprising a client/customer number and a matter number. The computer program further causes the computer to determine an email storage location on an electronic storage device from the storage location identifier and automatically store the email to the email storage location on the electronic storage device.

The present invention has been described in terms of the preferred embodiment, and it is recognized that equivalents, alternatives, and modifications, aside from those expressly stated, are possible and within the scope of the appending claims.

What is claimed is:

1. A non-transitory computer readable storage medium having stored thereon a computer program for saving an email, the computer program comprising instructions that cause a processor to:

scan an email message for a topic identifier;

determine a suggested storage location for the email message based on the topic identifier;

display a user interface to a user to prompt the user whether to save the email message at the suggested storage location;

receive an input from the user via the user interface to save the email message at the suggested storage location or at a user-selected storage location; and saving the email message based on the user input.

2. The computer readable storage medium of claim 1 wherein the computer program instructions further cause the processor to generate a name for the email message and to save the message using the generated name.

3. The computer readable storage medium of claim 1 wherein the computer program instructions further cause the processor to generate a name for the email message based on at least a date of the email message.

4. The computer readable storage medium of claim 1 wherein the computer program instructions further cause the processor to:

generate a name for the email message;
display the name in the user interface; and
allow the user to modify the name, if desired.

5. The computer readable storage medium of claim 1 wherein the computer program instructions cause the processor to determine the suggested storage location by:

identifying a folder within a database based on a first portion of the topic identifier;
identifying a sub-folder within the identified folder based on a second portion of the topic identifier; and
selecting the identified sub-folder as the suggested storage location.

6. The computer readable storage medium of claim 1 wherein the computer program instructions cause the processor to:

scan the email message for a second topic identifier; and
determine a second suggested storage location for the email message based on the second topic identifier.

7. The computer readable storage medium of claim 1 wherein the computer program instructions further cause the processor to convert the email message into a different file format before saving the email message.

8. A non-transitory computer readable storage medium having stored thereon a computer program for saving an email, the computer program comprising instructions that:

cause a processor to scan at least one of a subject line and a body of an email message for a topic identifier, the email message residing within an email program;
cause the processor to determine a storage location on an electronic storage medium for the email message based on the topic identifier, the storage location independent of the email program; and
cause the processor to save the email message at the storage location.

9. The computer readable storage medium of claim 8 wherein the computer program instructions further cause the processor to generate a name for the email message based on at least a date associated with the email message.

10. The computer readable storage medium of claim 9 wherein the computer program instructions further cause the processor to prompt a user to edit the generated name for the email message.

11. The computer readable storage medium of claim 8 wherein the computer program instructions further cause the processor to prompt a user on a user interface to save the email message at the storage location.

12. The computer readable storage medium of claim 11 wherein the computer program instructions further cause the processor to receive an input from the user via the user interface to save the email message at the storage location or at a user-selected storage location.

13. The computer readable storage medium of claim 8 wherein the computer program instructions further cause the processor to convert an electronic file format of the email message into an electronic file format different from a default electronic file format used by the email program.

14. A non-transitory computer readable storage medium having stored thereon a computer program for saving an email message, the computer program comprising instructions that cause a processor to:

monitor a folder of an email program for new emails;
upon identifying that the folder has received a new email, prompt a user to save the email;
if the user elects to save the email:
access the email to locate information for generating a file name for the email and to locate a topic identifier associated with a storage location in a database;
query the database to locate the storage location;
generate a file name for the email, the file name including a date associated with the email; and
prompt the user to save the email at the storage location identified via the topic identifier.

15. The computer readable storage medium of claim 14 wherein the computer program instructions cause the processor to locate the topic identifier by comparing text from a subject line of the email to a preset character pattern.

16. The computer readable storage medium of claim 14 wherein the computer program instructions cause the processor to locate the storage location by:

comparing a first set of characters of the topic identifier to names of a plurality of folders in the database;
upon identifying a folder having a name that includes the first set of characters of the topic identifier, comparing a second set of characters of the topic identifier to a name of at least one sub-folder within the identified folder; and
upon identifying a sub-folder having a name that includes the second set of characters of the topic identifier, selecting the identified sub-folder as the storage location.

17. The computer readable storage medium of claim 14 wherein the computer program instructions further cause the processor to:

change the electronic file format of the email; and
save the email with the changed electronic file format.

18. The computer readable storage medium of claim 14 wherein the computer program instructions further cause the processor to include a name of a sender or recipient of the email and text from a subject line of the email in the generated file name for the email.

19. The computer readable storage medium of claim 14 wherein the computer program instructions further cause the processor to prompt the user to edit the generated file name.

20. The computer readable storage medium of claim 14 wherein the computer program instructions further cause the processor to automatically edit the generated file name if the generated file name exceeds a maximum number of allowable characters.

21. The computer readable storage medium of claim 14 wherein the computer program instructions further cause the processor to prompt a user to select a storage location if the email does not include a topic identifier.

22. A non-transitory computer readable storage medium having stored thereon a computer program for saving emails comprising instructions that:
- cause a processor to monitor and identify outbound emails from an unassociated email program;
- cause the processor to determine a storage location on an electronic storage medium for each identified email based on a topic identifier in each identified email, the storage location independent of the email program; and
- cause the processor to save the identified email to the storage location.

23. The computer readable storage medium of claim 22 wherein the computer program instructions further cause the processor to prompt a user with a suggested name for saving an identified email.

24. The computer readable storage medium of claim 22 wherein the computer program instructions further cause the processor to allow a user to interrupt the program to prevent saving of the identified email.

25. The computer readable storage medium of claim 22 wherein the computer program instructions further cause the processor to monitor incoming emails into the unassociated email program and to store the incoming emails to the electronic storage medium.

26. The computer readable storage medium of claim 25 wherein the computer program instructions further cause the processor to save emails in a format different than an email format of the unassociated email program.

27. The computer readable storage medium of claim 22 wherein the computer program instructions further cause the processor to assign a name to the identified email.

28. The computer readable storage medium of claim 27 wherein the computer program instructions further cause the processor to generate the name from a characteristic of the identified email.

* * * * *